July 28, 1959 F. YOVICH 2,897,002
RAIN VISOR FOR AUTOMOBILES
Filed Aug. 19, 1957 2 Sheets-Sheet 2
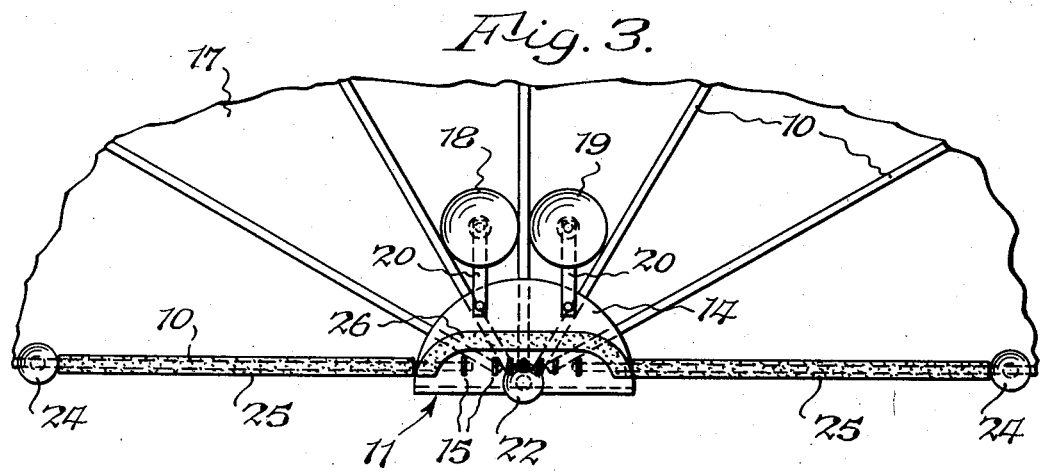
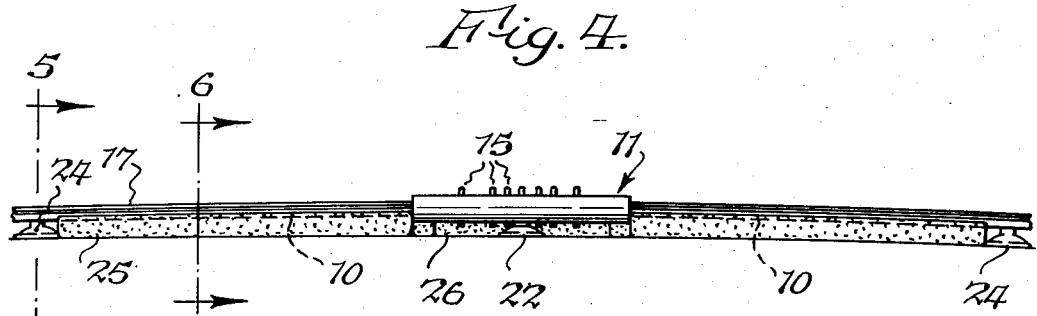
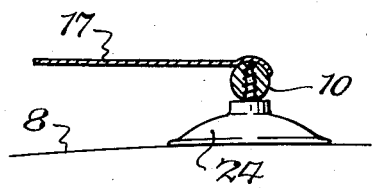
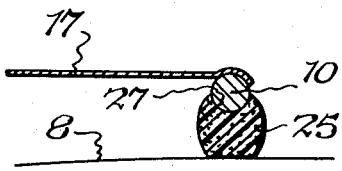
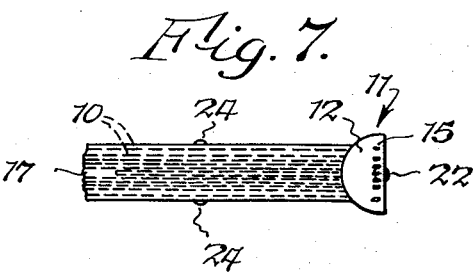
INVENTOR.
Frederick Yovich
BY Parker & Kirchner
Attorneys.

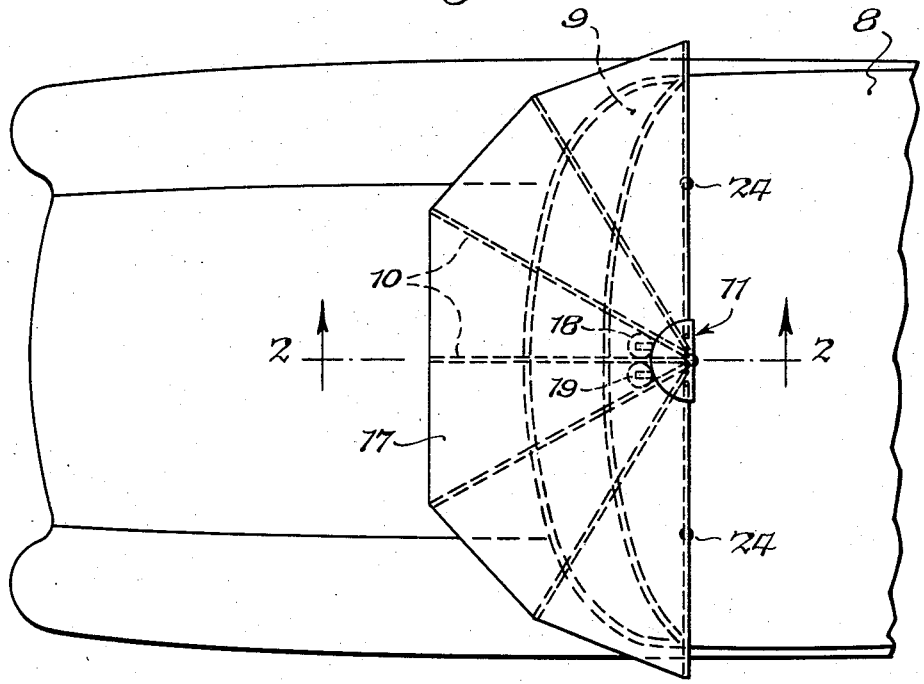
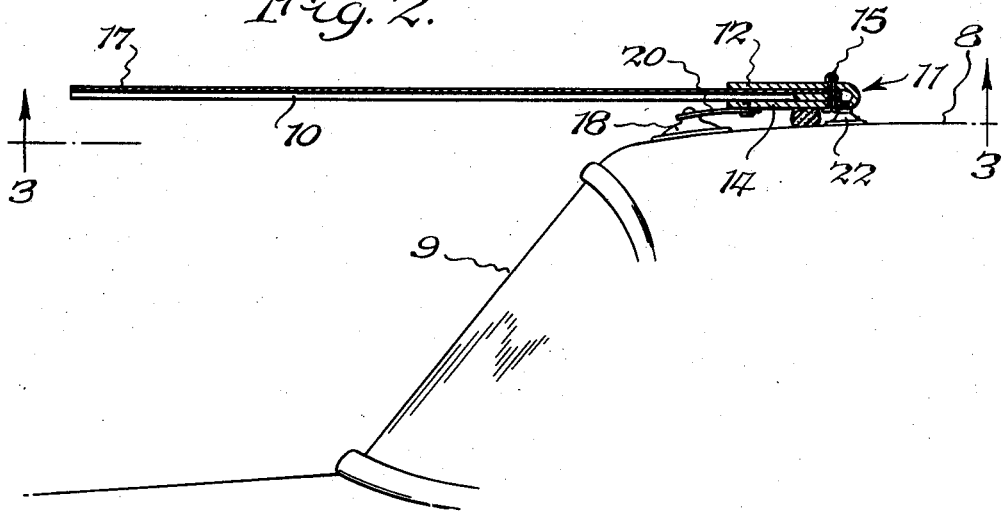

2,897,002

RAIN VISOR FOR AUTOMOBILES

Frederick Yovich, Buffalo, N.Y., assignor of one-half to Frank Ciotti, Weirton, W. Va.

Application August 19, 1957, Serial No. 678,879

3 Claims. (Cl. 296—95)

This invention relates to improvements in visors which may be applied to an automobile to extend over the windshield to keep the windshield clear in case of rain. Visors of this kind are particularly designed for use in connection with seeing motion pictures in drive-in theatres.

One of the objects of this invention is to provide a visor of this type which can be readily applied over the windshield of an automobile and which when not in use and removed from its operative position can be folded to occupy a compact space.

It is also an object of this invention to provide a visor of this type with means for preventing rain water from flowing from the top of the automobile downwardly under the visor and across the windshield.

In the accompanying drawings which illustrate by way of example one embodiment of my invention:

Fig. 1 is a top plan view of the front portion of an automobile provided with a visor embodying this invention.

Fig. 2 is a fragmentary sectional elevation thereof on an enlarged scale on line 2—2, Fig. 1.

Fig. 3 is a fragmentary bottom plan view thereof approximately on line 3—3, Fig. 2.

Fig. 4 is a fragmentary rear elevation thereof.

Figs. 5 and 6 are fragmentary transverse sectional elevations on lines 5—5 and 6—6 respectively of Fig. 4.

Fig. 7 is a plan view on a reduced scale showing the visor when folded.

In Figs. 1 and 2, 8 represents the roof or top of an automobile and 9 represents a windshield.

My improved visor is constructed to be removably attached to the roof or top of an automobile, for example, by suction cups, and includes a plurality of stays or braces 10 each of which has one end pivotally mounted on a suitable holder or support 11 which is preferably made of a pair of parallel upper and lower plates 12 and 14, those shown being formed integral of each other by being formed of a single piece or plate of metal or other material, formed or bent into U-shape, as shown. The inner ends of the stays extend into the space between the upper and lower plates of the holder and are pivoted to these plates in any suitable manner, for example, by means of pins 15 extending through holes in the upper and lower plates of the holder. Each pin also extends through a hole in a stay. The stays serve to support a flexible fabric sheet or film 17 which is secured to each of the stays and is spread outwardly, as shown in Figs. 1 and 2, when the stays are swung outwardly away from each other about their pivots, somewhat like an umbrella.

The visor may be secured to the roof or top of the automobile in any suitable manner, and in the construction shown a pair of suction cups 18 and 19 are connected with the bottom plate 14 of the holder by means of forwardly extending arms 20. These arms are preferably made of a material which may be bent or shaped as may be desired to best fit the suction cups 18 to the vehicle top, regardless of its contour, so that my visor may readily be adapted for use on automobiles having tops of different contour. Preferably an additional suction cup 22 is provided which is secured to the rear portion of the lower plate 14 in position to cooperate with the top or roof 8.

The stays or braces 10 of the visor are mounted to swing toward each other into a relatively compact space, as shown in Fig. 7, in which the sheet material may be folded about the stays in any suitable manner. I therefore, also provide means when the visor is mounted on an automobile to hold the stays in their spread out or extended positions and for this purpose the two outer stays are provided with suction cups 24 suitably secured thereto. These suction cups may also be applied to the roof or top of the automobile and serve mainly to hold the visor in the open or unfolded position in which the sheet material is spread out to protect the windshield.

With visors of the type disclosed there is the possibility that rain falling on the roof or top 8 of the automobile may flow forward and downwardly across the windshield thus obstructing the view ahead. In order to prevent water from flowing downwardly over the windshield, I have provided dams or deflectors 25 which are mounted on the lower face of the two outer stays of the visor, and an additional dam or deflector 26 is secured to the lower plate 14 of the stay holder. These dams or deflectors may be cemented or glued to the plate 14 and the under surface of the outer stays or braces. If the braces are made of circular cross section, as shown in Figs. 5 and 6, the dams or deflectors 25 are preferably shaped so as to provide on their upper surfaces recesses 27 fit around the lower faces of the braces so as to enable the dams or deflectors to be securely attached or cemented to the bases. The fabric or web 17 may also be cemented to the upper surface of the stays or braces 10 and if these braces are made of wood, the suction cups 24 may be fastened to the same by means of the usual attaching screws as shown in Fig. 5. Since the roof or top of automobiles slopes downwardly from the middle portion of the same, water will flow along the dams 25 and 26 downwardly side-wise along the roof of the auto and thus avoid obstructing in any way the view through the windshield.

The visor described has the advantages that it is collapsible into a small compact space so that it can readily be stored in an automobile when not in use. When needed it can be easily and quickly applied to the automobile since no attaching means other than suction cups are required.

It will be understood that various changes in the details, materials and arrangements of parts, which have been herein described and illustrated in order to explain the nature of the invention, may be made by those skilled in the art, within the principle and scope of the invention, as expressed in the appended claims.

I claim:

1. A rain visor for automobile windshields including a supporting member having upper and lower plates spaced apart, stays having their inner ends extending between said plates and pivoted thereto, said plates engaging said stays to hold the same in substantially parallel relation to said plates, an arm secured to the lower of said plates and extending forwardly therefrom, a suction cup secured to the front end of said arm in position to engage the top of the automobile, another suction cup mounted on the rear end of said lower plate for cooperation with said automobile top, a flexible sheet of waterproof material to which said stays are secured at intervals, two of said stays being mounted to swing outwardly toward the opposite sides of said supporting member, and suction cups mounted on said last mentioned stays for cooperation with the automobile top to hold said last mentioned two stays in their outer positions to spread said flexible material over the windshield above the same.

2. A rain visor for automobile windshields including a supporting member having upper and lower plates spaced apart, a plurality of stays having their inner ends fitting between said plates to hold said stays against sagging downwardly and including outer stays and intermediate stays having their inner ends extending between said plates and pivoted thereto, a flexible sheet of waterproof material connected to said stays to be stretched over the windshield, means for releasably securing said supporting member to the top of an automobile, suction cups secured to the outer stays to be attached to the top of the automobile for holding said stays and said sheet in stretched out positions, and dams of flexible material secured to the underface of said outer stays in position to be pressed against the top of the automobile when said suction cups of said outer stays are attached thereto for preventing water from flowing forwardly under said stays across said windshield.

3. A rain visor according to claim 2 and including a dam of flexible material secured to the underface of said supporting member and pressed against the automobile top when said supporting member is secured to the top and abutting against said dams of said outer stays to prevent rain water from flowing forwardly from said top across the windshield.

References Cited in the file of this patent
UNITED STATES PATENTS

| | | |
|---|---|---|
| 1,057,310 | White | Mar. 25, 1913 |
| 2,121,264 | Rubottom | June 21, 1938 |
| 2,547,770 | Pelton | Apr. 3, 1951 |
| 2,549,662 | Carpenter | Apr. 17, 1951 |
| 2,609,042 | Chamberlain | Sept. 2, 1952 |
| 2,633,381 | Francis | Mar. 31, 1953 |
| 2,668,646 | Nielsen | Feb. 9, 1954 |
| 2,679,255 | Stafford | May 25, 1954 |
| 2,736,375 | Rupert | Feb. 28, 1956 |